(12) United States Patent
Boyer et al.

(10) Patent No.: US 7,995,568 B2
(45) Date of Patent: Aug. 9, 2011

(54) CAPTURING USER INTERFACE SWITCH STATES

(75) Inventors: John M. Boyer, Victoria (CA); Vladimir Trakhtenberg, Nanaimo (CA)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 11/423,485

(22) Filed: Jun. 12, 2006

(65) Prior Publication Data

US 2007/0288857 A1    Dec. 13, 2007

(51) Int. Cl.
 H04L 12/50 (2006.01)
 H04Q 11/00 (2006.01)
(52) U.S. Cl. .................................. 370/360; 370/359
(58) Field of Classification Search .................. 370/359, 370/360
 See application file for complete search history.

(56) References Cited

U.S. PATENT DOCUMENTS

| | | | |
|---|---|---|---|
| 5,577,209 A | 11/1996 | Boyle et al. | |
| 5,758,068 A | 5/1998 | Brandt et al. | |
| 5,787,175 A | 7/1998 | Carter | |
| 5,991,399 A | 11/1999 | Graunke et al. | |
| 6,018,801 A | 1/2000 | Palage et al. | |
| 6,253,326 B1 | 6/2001 | Lincke et al. | |
| 6,449,721 B1 | 9/2002 | Pensak et al. | |
| 6,738,077 B1 | 5/2004 | Wendker et al. | |
| 6,948,133 B2 | 9/2005 | Haley | |
| 7,039,871 B2 | 5/2006 | Cronk | |
| 7,203,966 B2 | 4/2007 | Abburi et al. | |
| 7,406,599 B1 | 7/2008 | Pravetz et al. | |
| 7,430,714 B1 | 9/2008 | Savitzky et al. | |
| 2002/0099938 A1 | 7/2002 | Spitz | |
| 2002/0196268 A1 | 12/2002 | Wolff et al. | |
| 2004/0073511 A1 | 4/2004 | Beaumont et al. | |
| 2004/0168150 A1 | 8/2004 | Ziv | |
| 2005/0076215 A1 | 4/2005 | Dryer | |
| 2005/0091402 A1 | 4/2005 | Satagopan et al. | |
| 2005/0278793 A1 | 12/2005 | Raley et al. | |

OTHER PUBLICATIONS

Ellen C. Tran, "Office Action", U.S. Appl. No. 11/423,572, Notification Date: Nov. 12, 2009, 13 pages.
Ellen C. Tran, "Final Office Action", U.S. Appl. No. 11/423,572, Notification Date: Mar. 31, 2010, 12 pages.
Ellen C. Tran, "Notice of Allowance and Fee(s) Due", U.S. Appl. No. 11/423,572, Date Mailed: Sep. 10, 2010, 23 pages.
Ghazal B. Shehni, "Office Action", U.S. Appl. No. 11/423,527, Notification Date: Jul. 31, 2009, 12 pages.
Ghazal B. Shehni, "Final Office Action", U.S. Appl. No. 11/423,527, Notification Date: Jan. 4, 2010, 10 pages.
Ghazal B. Shehni, "Office Action", U.S. Appl. No. 11/423,527, Notification Date: Aug. 23, 2010, 12 pages.
Micah Dubinko, Xform Essentials, 2003, p. 119.
State Services Commission, "New Zealand E-government Interoperability Framework (NZ e-GIF)", Version 3.0, Introduction, Mar. 2006, 96 pages.
Government of India, Ministry of Communications and Information Technology, Department of Information Technology, National Informatics Centre, "I F E G Interoperability Framework for E-Governance Technical Standards", Released May 31, 2004, 108 pages.
Shehni, Ghazal B., PTO Final Office Action, U.S. Appl. No. 11/423,527, 17 pages.
Ellen C. Tran, Notice of Allowance and Fee(s) Due, U.S. Appl. No. 11/423,572, Date Mailed Feb. 28, 2011, 5 pages.

*Primary Examiner* — Ronald Abelson
(74) *Attorney, Agent, or Firm* — Ayla Lari; Hoffman Warnick LLC

(57) ABSTRACT

The invention is directed to the capturing of user interface switch states. A method according to an embodiment of the invention includes: adding a state attribute to a UI switch control, the state attribute containing an expression; evaluating the expression relative to a UI binding of the UI switch control, if given, or a UI binding context node of the UI switch control, otherwise; and interpreting a result of the expression as a data layer node whose content is an ID reference to a case of UI controls that must be selected by the UI switch control.

6 Claims, 3 Drawing Sheets

FIG. 1

```
<data>
    <person>...</person>
    <person>...</person>
    <person>...</person>
    <person>...</person>
</data>
```

FIG. 2

```
<person>
    <name>Mom</name>
    <age>38</age>
    <demographics case="ADULT">
        <adult>
            <ugrad>true</ugrad>
            <smoker></smoker>
        </adult>
        <child>
            <driver></driver>
            <GPA></GPA>
        </child>
    </demographics>
</person>
```

FIG. 3

```
<xforms:repeat nodeset="/data/person">
  <xforms:input ref="name"> ... </xforms:input>
  <xforms:input ref="age"> ... </xforms:input>
  <xforms:switch ref="demographics" xfdl:state="@case">
    <xforms:case id="ADULT" selected="true">
      <xforms:input ref="adult/ugrad"> ... </xforms:input>
      <xforms:input ref="adult/smoker"> ... </xforms:input>
    </xforms:case>
    <xforms:case id="CHILD" selected="false">
      <xforms:input ref="child/driver"> ... </xforms:input>
      <xforms:input ref="child/GPA"> ... </xforms:input>
    </xforms:case>
  </xforms:switch>
</xforms:repeat>
```

FIG. 4

CAPTURING USER INTERFACE SWITCH STATES

BACKGROUND OF THE INVENTION

1. Field of the Invention

The present invention generally relates to user interfaces. More specifically, the present invention is directed to the capturing of user interface switch states.

2. Related Art

The xforms:switch is a grouping construct that allows sets of user interface (UI) controls called "cases" to be grouped together. A user can toggle from one case to another to view and interact with the UI controls in each case.

XForms 1.0 Second Edition makes it clear that the selected attributes of the cases are used for initialization only and that the selected attributes are not expected to change value as a user switches to the various cases. When the cases represent panels of a wizard-like guided interview system, this is appropriate. However, the construct can also be used by form authors to switch between groups of UI controls that are only applicable to certain scenarios parameterized by user input. For example, the user may be given a choice between pay by invoicing, credit card, or electronic funds transfer. Based on choice, the user interface "switches" to the appropriate set of controls, such as those that allow specification of a corporate account for invoicing, or card number and expiry for credit card, and so forth. In this case, saving and reloading the form yields the undesirable result that the payment method selected by the UI switch state has been lost.

The loss of switch state is of particular importance in archival and security contexts. If the switch state cannot be preserved when it is appropriate, then the switch cannot be used in archival documents. Further, if the switch state cannot be preserved, then a digital signature over markup that includes a switch is insecure since the UI appearance changes in an important way without invalidating the signature over the markup.

SUMMARY OF THE INVENTION

The present invention is directed to the capturing of user interface switch states.

A first aspect of the present invention is directed to a method for capturing user interface (UI) switch states, comprising: adding a state attribute to a UI switch control, the state attribute containing an expression; evaluating the expression relative to a UI binding of the UI switch control, if given, or a UI binding context node of the UI switch control, otherwise; and interpreting a result of the expression as a data layer node whose content is an ID reference to a case of UI controls that must be selected by the UI switch control.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a screenshot of an illustrative form provided in accordance with the present invention.

FIG. 2 depicts an overview of a data layer in the XML source used to generate the form of FIG. 1.

FIG. 3 depicts an example of the internal structure of a person element in the XML source used to generate the form of FIG. 1.

FIG. 4 depicts the syntactic form of a switch element contained in a repeat element in the XML source used to generate the form of FIG. 1.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention solves the problem of allowing a form author to indicate the UI switches whose state must be preserved and the problem of allowing the states of the identified UI switches to be preserved in a form. This is not done by simply writing the selected state into the state attributes of the xforms:switch for several reasons: 1) this would contravene the XForms standard; 2) such a solution would conflict with the desire to create a presentation template signature; such a signature could be used to certify a correct form application to the end user, but it would break if the selected attributes of the switch were modified; 3) the method completely breaks when a switch is used within a repeat, since the markup for a switch is used to generate multiple run-time UI switch objects. Hence, the present invention solves the problem of preserving the states of all run-time UI switch objects when they form a many-to-one relationship with the number of switch elements appearing in the document markup.

In accordance with the present invention, an attribute called "state" is added to the switch element. The state attribute contains an XPath expression that is evaluated relative to the UI binding, if given, or the UI binding context node, otherwise. The result of the expression is interpreted as a node whose content is an ID reference to the case that must be selected by the switch. If the result does not match any case, then the default is to select the case according to normal XForms rules.

If the state attribute is not applied to the switch by the form author, then the form author has indicated that the switch state need not be preserved for archival/security purposes, so the switch acts as specified in XForms 1.0 Second Edition.

If the form author does apply a state attribute, then the case indicated by the state is selected during form user interface initialization in preference to the case selection specified by XForms. Once the form is initialized, then any toggle action to a new case ID causes an update to the node referenced by the state attribute. Further, once the form is initialized, then the node referenced by the state attribute can also be changed by other means, such as setvalue or even an xforms calculate.

Any change to the node indicated by the state attribute causes the switch to select the case indicated by the node (or to use the default case selection method if the node does not contain the ID of a case in the switch). The fact that the state attribute is evaluated relative to the UI binding or UI binding context node means that when the switch is within a repeat, then the state of each run-time switch object can be stored in the data subtree corresponding to each row of the repeat.

Figure 1:
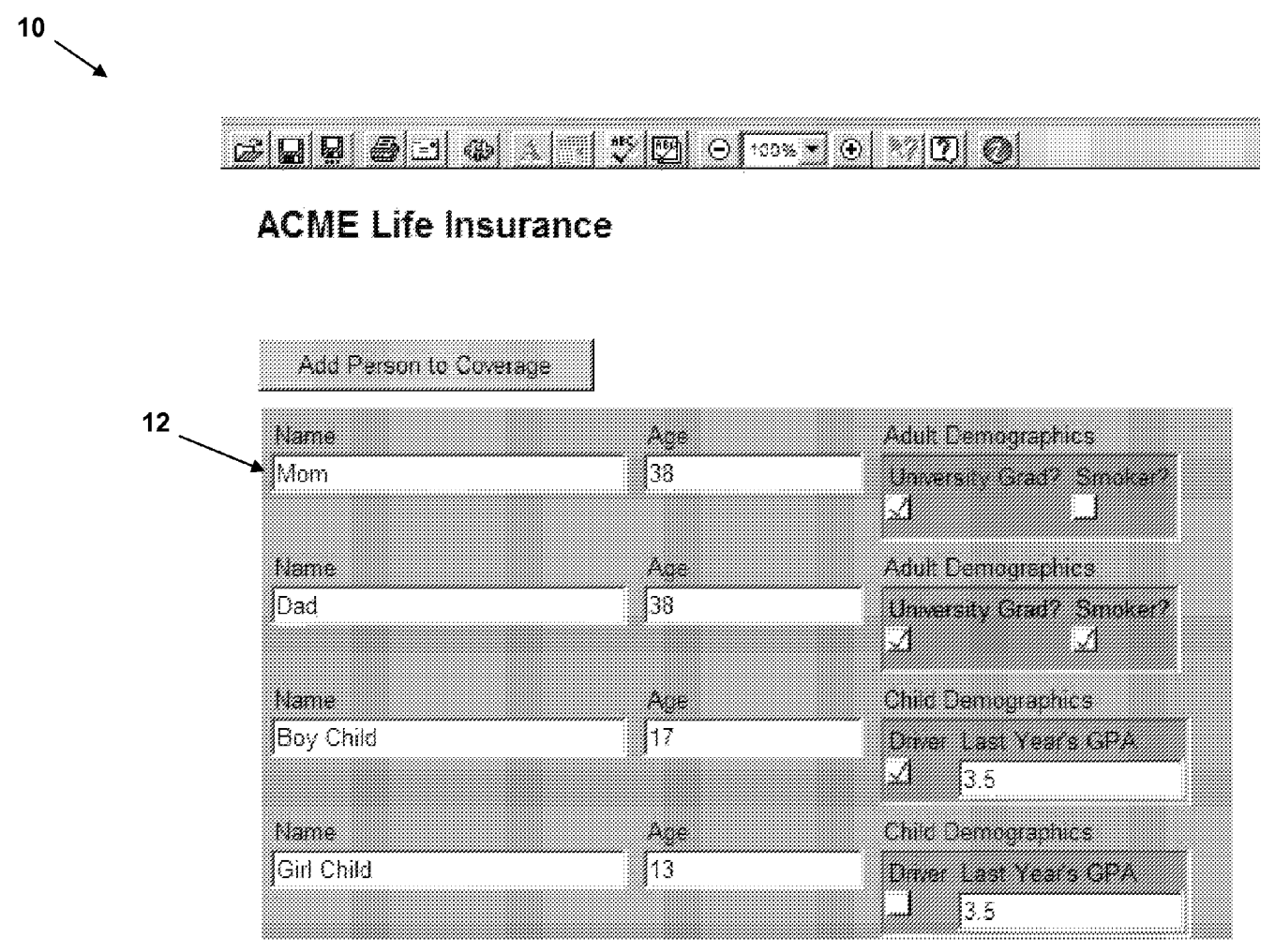

An example of a use of the present invention is provided below. A screenshot of an illustrative form 10 is depicted in FIG. 1. The XML serialization, or source, that generated the form 10 is as follows:

```xml
-<XFDL xmlns:designer="http://www.ibm.com/xmlns/prod/workplace/forms/designer/2.6"
    xmlns:ev="http://www.w3.org/2001/xml-events"
    xmlns:xfdl="http://www.ibm.com/xmlns/prod/XFDL/7.0"
    xmlns:xforms="http://www.w3.org/2002/xforms"
    xmlns="http://www.ibm.com/xmlns/prod/XFDL/7.0"
    xmlns:xsd="http://www.w3.org/2001/XMLSchema"
    xmlns:xsi="http://www.w3.org/2001/XMLSchema-instance"> – <globalpage sid="global">
 - <global sid="global">
      <designer:date>20060523</designer:date>
    - <formid>
        <title></title>
        <serialnumber>123456789</serialnumber>
        <version>1</version>
      </formid>
      <designer:version>2.6.0.297</designer:version>
      <bgcolor>#FFFFC8</bgcolor>
   - <xformsmodels>
     - <xforms:model>
       - <xforms:instance xmlns="" id="INSTANCE1">
         - <data>
           - <person>
               <name>Mom</name>
               <age>38</age>
             - <demographics case="ADULT">
               - <adult>
                   <ugrad>true</ugrad>
                   <smoker></smoker>
                 </adult>
               - <child>
                   <driver></driver>
                   <GPA></GPA>
                 </child>
               </demographics>
             </person>
           - <person>
               <name>Dad</name>
               <age>38</age>
             - <demographics case="ADULT">
               - <adult>
                   <ugrad>true</ugrad>
                   <smoker>true</smoker>
                 </adult>
               - <child>
                   <driver></driver>
                   <GPA></GPA>
                 </child>
               </demographics>
             </person>
           - <person>
               <name>Boy Child</name>
               <age>17</age>
             - <demographics case="CHILD">
               - <adult>
                   <ugrad></ugrad>
                   <smoker></smoker>
                 </adult>
               - <child>
                   <driver>true</driver>
                   <GPA>3.5</GPA>
                 </child>
               </demographics>
             </person>
           - <person>
               <name>Girl Child</name>
               <age>13</age>
             - <demographics case="CHILD">
               - <adult>
                   <ugrad></ugrad>
                   <smoker></smoker>
                 </adult>
               - <child>
                   <driver></driver>
                   <GPA>3.5</GPA>
                 </child>
               </demographics>
             </person>
           - <person>
               <name></name>
               <age></age>
```

```
                    - <demographics case="CHILD">
                        - <adult>
                              <ugrad></ugrad>
                              <smoker></smoker>
                          </adult>
                        - <child>
                              <driver></driver>
                              <GPA></GPA>
                          </child>
                      </demographics>
                  </person>
              </data>
          </xforms:instance>
        - <xforms:bind nodeset="/data/person" relevant="position( )!=last( )">
            <xforms:bind calculate="if(../../age >= 18, 'ADULT', 'CHILD')"
              nodeset="demographics/@case"></xforms:bind>
          </xforms:bind>
          <xforms:insert at="1" nodeset="person[last( )=1]" position="before"
            ev:event="xforms-model-construct-done"></xforms:insert>
        </xforms:model>
      </xformsmodels>
    </global>
  </globalpage>
- 
  - <global sid="global">
        <label>PAGE1</label>
        <bgcolor>#FFFFC8</bgcolor>
    </global>
  - <label sid="LABEL_GROUP0">
    - <itemlocation>
          <x>13</x>
          <y>11</y>
          <width>245</width>
      </itemlocation>
      <value>ACME Life Insurance</value>
    - <fontinfo>
          <fontname>Arial</fontname>
          <size>12</size>
          <effect>bold</effect>
      </fontinfo>
    </label>
  - <table sid="TABLE1">
    - <xforms:repeat id="personListRepeat" nodeset="instance('INSTANCE1')/person">
      - <field sid="name1">
            <scrollhoriz>wordwrap</scrollhoriz>
          - <xforms:input ref="name">
                <xforms:label>Name</xforms:label>
            </xforms:input>
          - <itemlocation>
                <x>4</x>
                <y>4</y>
                <width>197</width>
            </itemlocation>
        </field>
      - <field sid="age1">
            <scrollhoriz>wordwrap</scrollhoriz>
          - <xforms:input ref="age">
                <xforms:label>Age</xforms:label>
            </xforms:input>
          - <itemlocation>
                <x>210</x>
                <y>4</y>
                <width>122</width>
            </itemlocation>
        </field>
      - <pane sid="PANE1" designer:visiblecase="0">
        - <xforms:switch ref="demographics" xfdl:state="@case">
          - <xforms:case id="ADULT" selected="true">
                <xforms:label>Adult Demographics</xforms:label>
              - <check sid="CHECK1">
                  - <xforms:input ref="adult/ugrad">
                        <xforms:label>University Grad?</xforms:label>
                    </xforms:input>
                </check>
              - <check sid="CHECK2">
                  - <xforms:input ref="adult/smoker">
                        <xforms:label>Smoker?</xforms:label>
                    </xforms:input>
                  - <itemlocation>
                        <after>CHECK1</after>
```

```
                </itemlocation>
            </check>
        </xforms:case>
      - <xforms:case id="CHILD" selected="false">
            <xforms:label>Child Demographics</xforms:label>
          - <check sid="CHECK1">
              - <xforms:input ref="child/driver">
                    <xforms:label>Driver</xforms:label>
                </xforms:input>
            </check>
          - <field sid="FIELD1">
              - <xforms:input ref="child/GPA">
                    <xforms:label>Last Year's GPA</xforms:label>
                </xforms:input>
              - <itemlocation>
                    <after>CHECK1</after>
                    <offsety>-5</offsety>
                    <width>125</width>
                </itemlocation>
                <scrollhoriz>wordwrap</scrollhoriz>
                <value></value>
            </field>
        </xforms:case>
    </xforms:switch>
  - <itemlocation>
        <x>341</x>
        <y>4</y>
        <width>194</width>
        <height>48</height>
    </itemlocation>
    <bgcolor>#8080FF</bgcolor>
    <border>on</border>
            </pane>
        </xforms:repeat>
      - <itemlocation>
            <x>17</x>
            <y>125</y>
            <width>567</width>
            <height>91</height>
        </itemlocation>
        <bgcolor>#FF8080</bgcolor>
    </table>
  - <button sid="BUTTON1">
      - <xforms:trigger>
            <xforms:label>Add Person to Coverage</xforms:label>
          - <xforms:action ev:event="DOMActivate">
                <xforms:insert nodeset="person" position="after"
                    at="index('personListRepeat')"></xforms:insert>
                <xforms:setfocus control="personListRepeat"></xforms:setfocus>
            </xforms:action>
        </xforms:trigger>
      - <itemlocation>
            <x>16</x>
            <y>88</y>
            <width>187</width>
            <height>30</height>
        </itemlocation>
    </button>
  - <spacer sid="vfd_spacer">
      - <itemlocation>
            <x>960</x>
            <y>1260</y>
            <width>1</width>
            <height>1</height>
        </itemlocation>
    </spacer>

</XFDL>
```

In the above source, the XML data layer comprises a root element called 'data' that contains multiple child elements called 'person'. An overview 20 of the data layer in the above-listed source, with the content of each <person> element omitted, is illustrated in FIG. 2. An example 30 of the internal structure of a <person> element in the above-listed source is illustrated in FIG. 3. This <person> element corresponds to the first row 12 of data displayed in the form 10 illustrated in FIG. 1.

At the user interface level, there exists a 'repeat' construct that binds to all of the <person> elements in the data layer and provides a set of user interface controls for each. The repeat does the binding with an XPath expression in the nodeset attribute, which matches all <person> elements that are children of the <data> element. The content of the repeat element is generated once for each person element. The form of the repeat element 40 in the above-listed source is depicted in FIG. 4.

Of particular note in FIG. 4, it can be seen that the repeat content includes a 'switch' 42, so a run-time UI switching construct is generated by the repeat once for each <person>. In this example, the switch 42 contains a 'ref' attribute 44 that resets its UI data context to be the <demographics> element 46 within the <person> element that the repeat sets as its initial UI context. If the ref attribute 44 were omitted from the switch, then the initial UI context (the <person> element itself) would become the UI context used within the switch 42.

In accordance with the present invention, an 'xfdl:state' attribute 48 has been added to the added to the switch 42. The xfdl:state attribute 48 is evaluated relative to the UI context of the switch 42, which is the <demographics> element 46 of the <person> element for which the row of UI controls was generated. The XPath expression "@case" 50 selects the 'case' attribute of the <demographics> element 46. The content of that attribute is matched to the content of the id attributes of the case elements in the switch, and the case with the matching id is selected.

Referring again to the form 10 depicted in FIG. 1, it is noted that the ADULT case is selected in the first two rows, so that the user can see the controls that map to the question of whether the person is a university grad or a smoker. But on the second two rows, the CHILD case is selected. It is noted in FIG. 4 and the above-listed source that the selected attribute is set to true on the ADULT case, so under pure XForms, the ADULT case would come up for all four rows. However, in this example, as can be seen in the above-listed source, the case attributes in the <demographics> elements of the latter two <person> elements are set to CHILD. Thus, the present invention imposes the CHILD value onto the case selection of the run-time switch objects in the third and fourth repeat rows.

The example form 10 also illustrates the dynamic nature of the xfdl:state attribute 48 by using a calculation on the demographic case attributes to set their content to ADULT or CHILD based on age. Thus, the present invention can be used to perform a calculation whose results directly change the state of a switch. For example, if you change the age value on the third row from 17 to 18, the switch automatically changes from the CHILD case to the ADULT case.

Another feature of the present invention is the two-way nature of the xfdl:state attribute that is added to switch. In the above example, the settings of the 'case' attributes in data are applied to the switch. Thus, information about the switch state flows from the data layer to the presentation layer. However, the XForms standard uses a "toggle" action as a means of changing the state of a run-time presentation-layer switch object. The present invention also reflects this change in the data node indicated by the xfdl:state. Thus, information about the switch state can also flow from the presentation layer to the data layer.

The present invention can be implemented on any now known or later developed computer system that is capable of executing computer program code. The computer program code can be provided on a computer-readable medium or provided in any other suitable manner.

The foregoing description of the embodiments of this invention has been presented for purposes of illustration and description. It is not intended to be exhaustive or to limit the invention to the precise form disclosed, and many modifications and variations are possible.

What is claimed is:

1. A method for capturing user interface (UI) switch states, comprising:
    adding a state attribute to a UI switch control, the state attribute containing an expression;
    evaluating the expression relative to a UI binding of the UI switch control, if given, or a UI binding of a context node of the UI switch control, otherwise; and
    interpreting a result of the expression as a data layer node whose content is an ID reference to a case of UI controls that must be selected by the UI switch control.

2. The method of claim 1, wherein, if the result of the expression is not a node or if the node content does not match any case ID, then a case selection for the UI switch control is made based on default or articulated properties of the cases.

3. The method of claim 1, wherein the UI switch control with the state attribute is used within a UI repeat control that iterates a UI switch more than once, imparting a different UI binding to each UI switch control so generated.

4. The method of claim 1, wherein the UI switch control comprises an XForms switch element, and wherein the expression comprises an XPath expression.

5. The method of claim 1, further comprising:
    selectively adding the state attribute to the UI switch control to preserve state.

6. The method of claim 1, further comprising:
    performing a toggle action on the UI switch control with the state attribute to change a switch case and update the data layer node indicated by the state attribute.

* * * * *